United States Patent Office 3,426,871
Patented Feb. 11, 1969

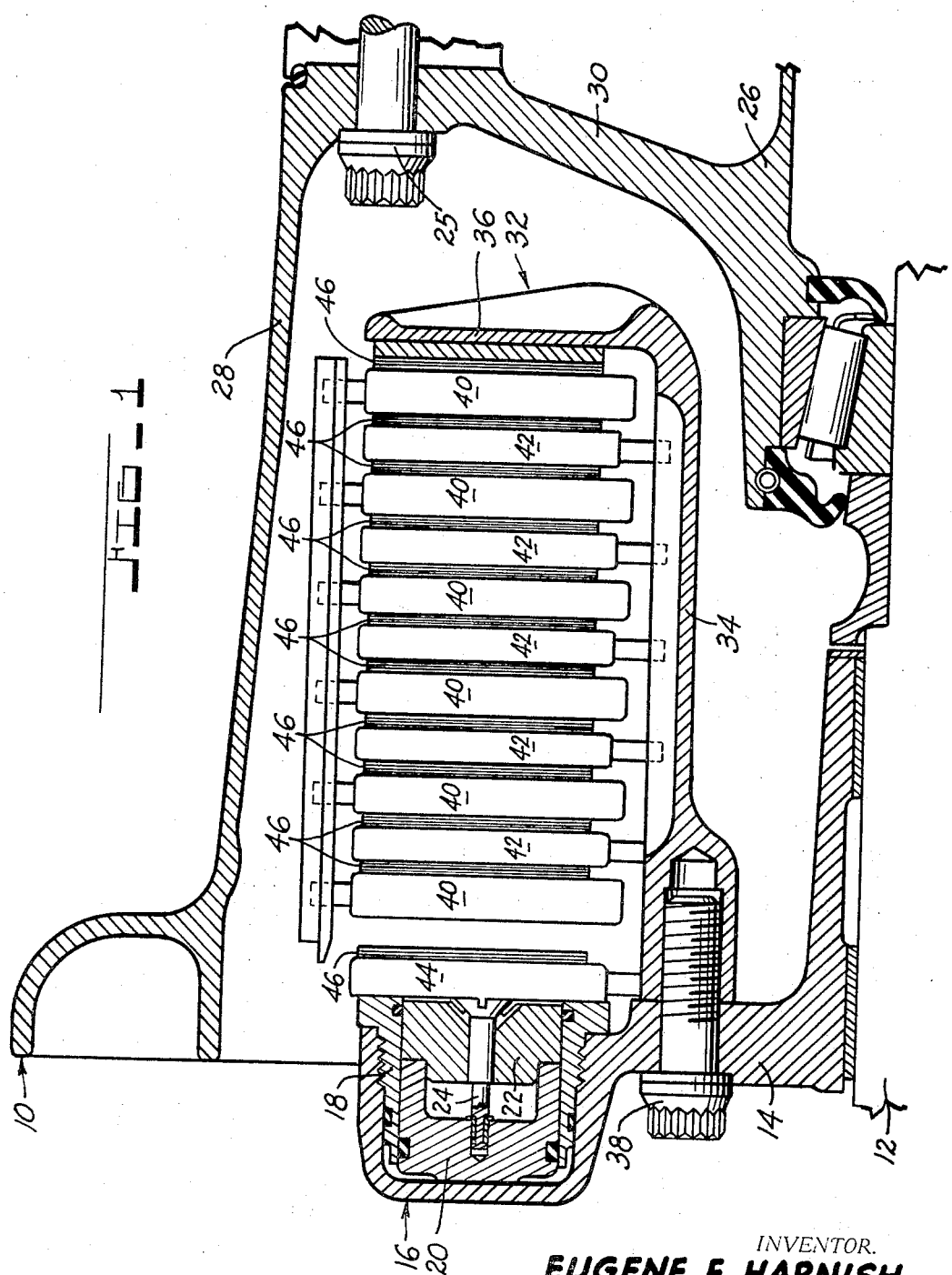

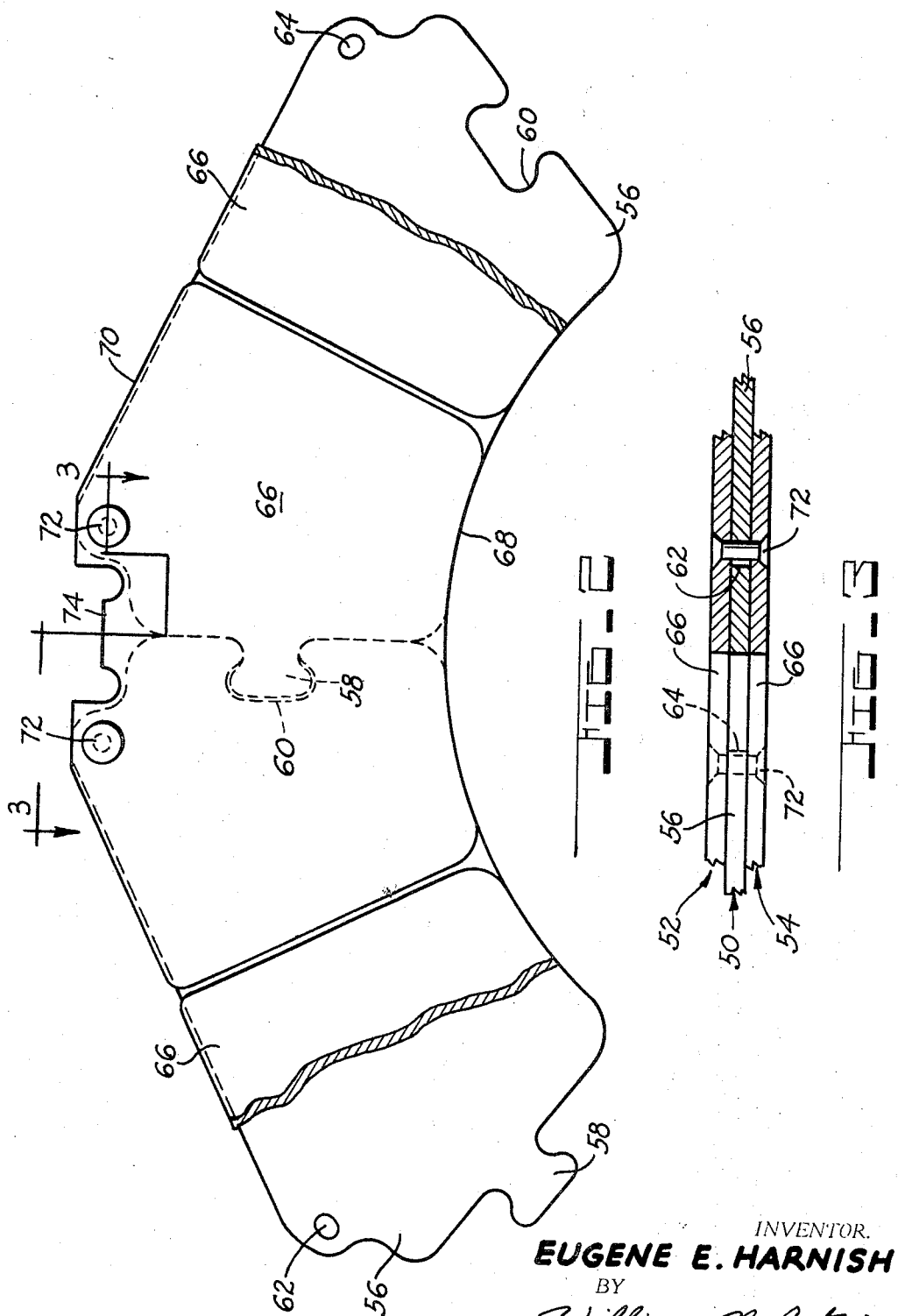

---

3,426,871
LAMINATED SEGMENTED ROTOR
Eugene E. Harnish, South Bend, Ind., assignor to The Bendix Corporation, a corporation of Delaware
Filed June 8, 1967, Ser. No. 644,667
U.S. Cl. 188—218                        8 Claims
Int. Cl. F16d 65/12, 13/60

ABSTRACT OF THE DISCLOSURE

The following relates to a friction disc element construction for a disc brake which is formed of three segmented laminations. The center lamination is formed of a plurality of segments which are dovetailed to each other to provide an integral core. Each of the outer laminations is formed of a plurality of segments which are staggered with respect to the center segments so that each dovetailed end of the center segments is located between the ends of an outer segment.

Background of the invention

Disc brakes which utilize segmented annular disc elements arranged to permit individual thermal expansion of the disc segments without interference between adjacent segments are shown and described in various prior art patents, such as, U.S. Patents 2,423,881, 2,683,504, 2,893,519, and 3,237,731. All disc brake elements to a greater or lesser degree, including those shown in the foregoing patents, tend to warp and wear upon extensive encounters with thermal shocks. Such warp and wear obviously will have a direct bearing on the effectiveness and life of any brake. In other words, higher degrees of warp and wear will reduce brake effectiveness and brake life, whereas, lesser degrees of warp and wear will increase brake effectiveness and brake life. Accordingly, any disc element construction which would eliminate or substantially reduce such warp and wear would constitute a significant advance in the art, and, particularly so, if such construction is less expensive than disc elements which are presently in use.

Summary of the invention

Accordingly, in view of the foregoing, it is an object of this invention to provide a unique friction disc element of the segmented type which will increase brake effectiveness and extend brake life.

A further object of this invention is to provide a segmented disc element which absorbs heat in a more uniform manner and withstands thermal shocks better than existing disc elements.

Another object of this invention is to provide a segmented disc element which is less expensive to fabricate than existing disc elements.

More specifically, it is an object of this invention to provide a disc element formed of three laminations, each of which is formed of a plurality of segments, wherein the center lamination segments are dovetailed to each other to form an integral core and the outer laminations are formed of segments which are in face-to-face contact with the center segments and staggered with respect thereto so that each dovetailed end of the center segments is located between the ends of an outer lamination segment.

Another object of this invention is to provide a disc element which utilizes only two types of stamped segments, one for the outer laminations and the other for the center or core lamination sandwiched therebetween, said laminations being joined by spin riveting.

The advantages of such a disc element construction over other known constructions are decidedly significant. First of all, this unique disc element construction requires a minimum number of parts and permits the use of a minimum amount of raw material. Furthermore, these parts can be made of low-cost steel stampings. In addition, fewer rivets are needed than in comparable brake disc constructions. More importantly, this disc construction retains the desirable characteristic of flexibility for unrestrained thermal expansion and contraction.

Other objects, features and advantages of the invention will be apparent from the following description of the invention taken in connection with the accompanying drawings.

Brief description of the drawings

FIGURE 1 is a sectional view of a portion of a symmetrical wheel and brake assembly which incorporates the invention;

FIGURE 2 is a side elevation of a portion of a symmetrical rotor removed from the brake assembly of FIGURE 1 with portions broken away for clarity; and FIGURE 3 is a sectional view taken along line 3—3 of FIGURE 2.

Description of the preferred embodiments

Referring to FIGURE 1, it will be seen that the wheel and brake assembly, which is illustrated includes a wheel 10 rotatably mounted on a stationary axle 12 and a stationary carrier member 14 which is connected to the axle through any suitable means, such as by a direct bolt connection (not shown). The construction for rotatably mounting the wheel 10 to axle 12 and fixing the stationary carrier member 14 to the axle 12 is well known, and a detailed description thereof is not deemed to be necessary. The carrier contains a plurality of fluid motors 16 each of which includes a protective sleeve 18 threadedly secured to the carrier and a piston 20 located and slidable in the sleeve. A block of insulating material 22 is secured to the head end of the piston by a threaded pin 24 for protecting the hydraulic brake fluid from the heat generated during braking. The wheel 10, which is formed of two sections fastened together by a plurality of bolts 25, includes a hub portion 26 and a rim portion 28 interconnected by a plurality of spokes 30. A torque tube 32 which includes a sleeve 34 and an annular backing plate flange 36 is fixedly secured to the carrier member 14 by a plurality of circumferentially spaced bolts 38.

The brake, which is illustrated, is of the disc type and includes a plurality of interleaved rotors 40 which are splined to and are rotated by the aircraft wheel 10, and includes stators 42 which are splined to sleeve 34 of the torque tube 32. The specific novel construction of the rotors will be described hereafter. Both the rotors and stators are movable axially and are sometimes referred to as a brake "stack." It is the frictional engagement of these relatively rotatable rotors and stators which produces the desired braking action on the aircraft wheel. A pressure plate 44, which is suitably attached to the fluid motor 16, forces the rotors 40 and stators 42 against each other upon activation of the motors by thrusting at one side of the stack and biasing the entire stack against the backing plate 36. Pressure plate 44, each of the stators 42, and the backing plate 36 have friction material lining 46 provided thereon.

Referring to FIGURES 2 and 3, which show the novel detailed construction of each of the rotors 40, it will be seen that each rotor is comprised of three laminations, an inner or center lamination 50 and two outer laminations 52 and 54. The inner lamination 50, which is the core of the disc, is formed of a plurality of annularly arranged arcuate inner segments 56 which are interconnected by a dovetail connection. More specifically, each of these inner segments includes a flared or wedge-like projection 58 extending from one end thereof and a mating flared or wedge-shaped opening 60 located at the opposite end thereof for receiving the flared projection of the next adjacent segment. This makes the core stable for circumferential tensile loads and transverse shear loads. Each inner segment 56 also includes two elongated rivet holes 62 and 64, one of which is located near one end of the segment and the other of which is located near the other end of the segment. These elongated holes in the core are designed to allow for differential thermal expansion and contraction between the outer laminates and the core.

Each of the outer laminations 52 and 54 is identical to the other and is formed of a plurality of like annularly arranged end-to-end arcuate outer segments 66 having radially inner and outer edges 68 and 70. These outer segments 66 are placed in face-to-face contact with the inner segments 56, but are staggered with respect thereto, so that each dovetailed end of the inner segments 56 are located between the ends of an outer segment 66. In other words each inner core segment 56 spans one half of each outer segment 66. In order to mutually connect the segments of the inner and outer laminations, each outer segment 66 is connected to a pair of dovetailed inner segments 56 by a pair of rivets 72. Each of the outer segments is formed with a key slot notch 74 in the outer edge 70 therefore, said notch being located between the pair of rivets. Each of these notches slidably engage axially extending keys located on the inner periphery of the aircraft wheel 10. It will be understood that, if desired, the key-slot arrangement could be reversed so that the slot is formed in the wheel and the key is formed on the outer edge of each segment 66.

From the foregoing it will be apparent that basically this unique brake disc construction involves only three interconnected segmented laminations, and no other support means, which can be formed from two basic steel stampings. The several advantages which flow from this novel inventive construction are believed to be obvious from the foregoing description, and other advantages may suggest themselves to those who are familiar with the art to which the invention relates.

Furthermore, although this invention has been described in connection with a specific embodiment, it will be obvious to those skilled in the art that various changes may be made in the form, structure and arrangement of parts without departing from the spirit of the invention.

Having thus described the various features of the invention what I claim as new and desire to secure by Letters Patent is:

1. In a wheel and brake assembly having axially extending key-slot type engaging means, a friction disc element comprising an inner annular lamination formed of a plurality of annularly arranged arcuate inner segments which are interconnected at the ends thereof to one another to provide an integral core capable of withstanding circumferential tensile and transverse shear loads, and a pair of outer laminations, each of which is formed of a plurality of annularly arranged end-to-end arcuate outer segments having radially inner and outer edges, said outer segments being in face-to-face contact with said inner segments and staggered with respect thereto so that the interconnected ends of adjacent inner segments are located between the ends of the same outer segment, means for mutually connecting said inner and outer segments while permitting thermal expansion of the individual segments in circumferential and radial directions, and mating key-slot type engaging means operatively connected to said disc element for slidable engagement with said first mentioned key-slot type engaging means.

2. In a wheel and brake assembly having axially extending key-slot type engaging means, a friction disc element comprising an inner annular lamination formed of a plurality of annularly arranged arcuate inner segments which are operatively connected at the ends thereof to one another to form a core, and a pair of outer laminations, each of which is formed of a plurality of annularly arranged end-to-end arcuate outer segments having radially inner and outer edges, said outer segments being in fact-to-face contact with said inner segments and staggered with respect thereto so that each outer segment has the operatively connected ends of a pair of adjacent inner segments located between the ends thereof, means for mutually connecting said inner and outer segments while permitting thermal expansion of the individual segments in circumferential and radial directions, and mating key-slot type engaging means operatively connected to said disc element for slidable engagement with said first mentioned key-slot type engaging means.

3. A friction disc element, as defined in claim 2, wherein each outer segment is connected to said pair of adjacent inner segments by a pair of rivets.

4. A friction disc element, as defined in claim 3, wherein said mating key-slot type engaging means is formed on one of said edges of each of said outer segments.

5. A friction disc element, as defined in claim 4, wherein said mating key-slot type engaging means is formed in said outer edge.

6. A friction disc element, as defined in claim 5, wherein said mating key-slot type engaging means is located between said pair of rivets.

7. A friction disc element, as defined in claim 6, wherein said inner segments include elongated rivet holes for permitting differential thermal expansion and contraction between said inner and outer segments.

8. A friction disc element, as defined in claim 7, wherein said mating key-slot engaging means is a slot for receiving an axially extending key of said wheel and brake assembly.

References Cited

UNITED STATES PATENTS

| | | |
|---|---|---|
| 2,423,882 | 7/1947 | Frank. |
| 2,753,032 | 7/1956 | Eason. |
| 3,237,731 | 3/1966 | DuBois _____ 188—218 |

GEORGE E. A. HALVOSA, *Primary Examiner.*

U.S. Cl. X.R.

192—107